United States Patent Office.

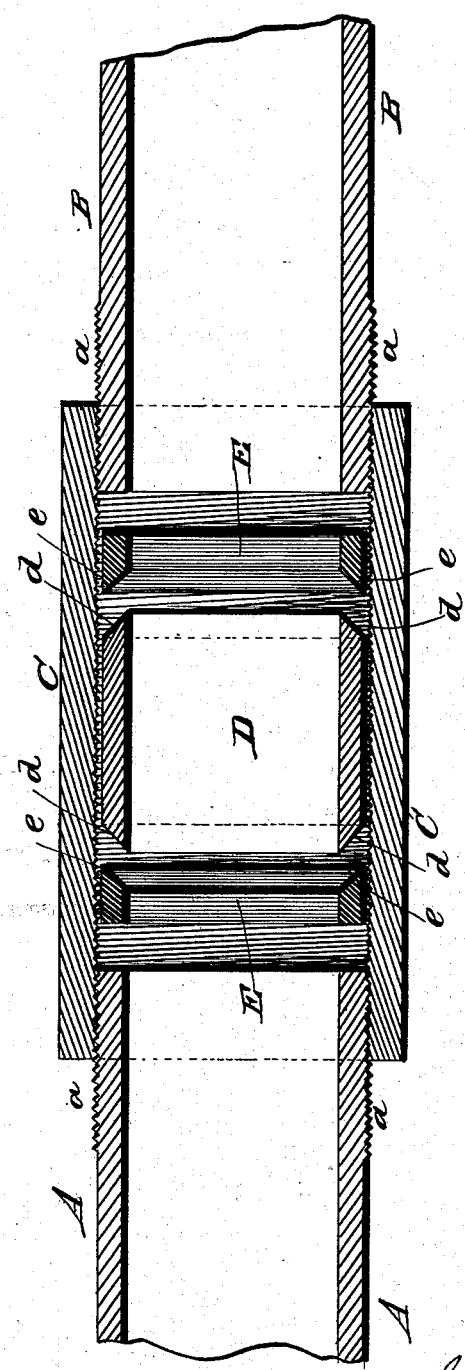

JAMES AGNEW, OF ALLEGHENY, AND WILLIAM AGNEW, OF PITTSBURG, PENNSYLVANIA.

PIPE-COUPLING.

SPECIFICATION forming part of Letters Patent No. 325,895, dated September 8, 1885.

Application filed June 18, 1885. (No model.)

*To all whom it may concern:*

Be it known that we, JAMES AGNEW, of Allegheny, in the county of Allegheny and State of Pennsylvania, and WILLIAM AGNEW, of Pittsburg, in the county of Allegheny and State of Pennsylvania, have invented certain new and useful Improvements in Pipe-Couplings for Natural-Gas Pipes; and we do hereby declare the following to be a full, clear, and exact description of the invention, such as will enable others skilled in the art to which it pertains to make and use the same.

Our invention relates to pipe-couplings, specially adapted for use with pipes for conducting natural gas.

The object of our invention is to combine, with the pipe-sections and with their receiving-sleeve, inexpensive tightening devices designed to prevent waste or leakage.

The invention consists in the features of construction and combination of parts hereinafter fully described, and pointed out in the claims.

The accompanying drawing illustrates a central longitudinal section of a pipe-joint with my improvements applied thereto.

A and B indicate the ends of the pipes, each being formed with exterior screw-threads, $a$, as shown.

C represents the coupling-sleeve interiorly screw-threaded to receive the pipe ends.

Centrally within the sleeve C is arranged, loosely or rigidly, a suitable ring, D, whose ends are beveled, as shown at $d\,d$.

Between the ends of this ring D and the adjacent ends of the respective pipes are interposed elastic or yielding gaskets or rings E E, whose inner faces $e\,e$ are beveled to correspond to the beveled ends of the ring D. These rings E E may be made of rubber or of soft metal. The pipe ends are screwed into the end of the sleeve C toward each other, and the contact of said pipe ends with the yielding rings E E will force the latter tightly against the beveled ends of the central ring, D, thus insuring a close joint and preventing leakage.

Having thus described our invention, what we claim as new, and desire to secure by Letters Patent, is—

In a pipe-coupling, the combination, with the screw-threaded pipe ends, of an interiorly-threaded sleeve to receive said ends, a central ring arranged within said sleeve and having beveled ends, as described, and yielding or elastic rings or gaskets interposed between the ends of the central ring and the pipe ends, substantially as and for the purpose set forth.

In testimony whereof we have signed this specification in the presence of two subscribing witnesses.

JAMES AGNEW.
WILLIAM AGNEW.

Witnesses:
EDWIN S. CRAIG,
GEORGE E. SHAW.